United States Patent
Eskin

(10) Patent No.: US 9,924,305 B2
(45) Date of Patent: Mar. 20, 2018

(54) MOBILE COMPUTING AND COMMUNICATION

(75) Inventor: Eleazar Eskin, Santa Monica, CA (US)

(73) Assignee: ACK VENTURES HOLDINGS, LLC, Boca Raton, FL (US)

( * ) Notice: Subject to any disclaimer, the term of this patent is extended or adjusted under 35 U.S.C. 154(b) by 0 days.

(21) Appl. No.: 11/974,110

(22) Filed: Oct. 11, 2007

(65) Prior Publication Data

US 2008/0039019 A1 Feb. 14, 2008

Related U.S. Application Data

(62) Division of application No. 09/775,194, filed on Feb. 1, 2001, now Pat. No. 7,299,007.

(51) Int. Cl.
*H04B 7/00* (2006.01)
*H04W 4/02* (2018.01)
(Continued)

(52) U.S. Cl.
CPC ............... *H04W 4/02* (2013.01); *G01S 1/68* (2013.01); *H04L 29/06* (2013.01); *H04L 67/04* (2013.01);
(Continued)

(58) Field of Classification Search
CPC .......... G01S 1/68; H04W 4/02; H04L 67/306; H04L 67/18
(Continued)

(56) References Cited

U.S. PATENT DOCUMENTS

| 4,847,698 A | 7/1989 | Freeman |
| 4,847,699 A | 7/1989 | Freeman |

(Continued)

FOREIGN PATENT DOCUMENTS

| DE | 19943549 A1 | 3/2001 |
| EP | 0697670 A1 | 2/1996 |

(Continued)

OTHER PUBLICATIONS

Chinese Office action dated Dec. 3, 2004.
(Continued)

*Primary Examiner* — Lee Nguyen
(74) *Attorney, Agent, or Firm* — McCarter & English, LLP; John S. Curran

(57) ABSTRACT

An application development platform enables applications to be created easily for, e.g., mobile devices that have short-range wireless communication capability. The development platform exposes a carefully chosen core set of services through an API. Each of the applications can broadcast its services to local and remote devices. Message delivery between devices is guaranteed even for messages that cannot be delivered directly by local short-range wireless transmission. Message delivery through other channels, including the Internet, can occur transparently to the user. Each device can be associated with an "owner", which can be a person or a entity. Services can be customized to the owner based on stored information that maps owners to devices. Information associated with each of the owners of devices can be stored centrally and used in connection with providing the services at each of the mobile devices. Virtual GPS capabilities can be provided for mobile devices that do not have GPS chips.

9 Claims, 17 Drawing Sheets

Figure 1:
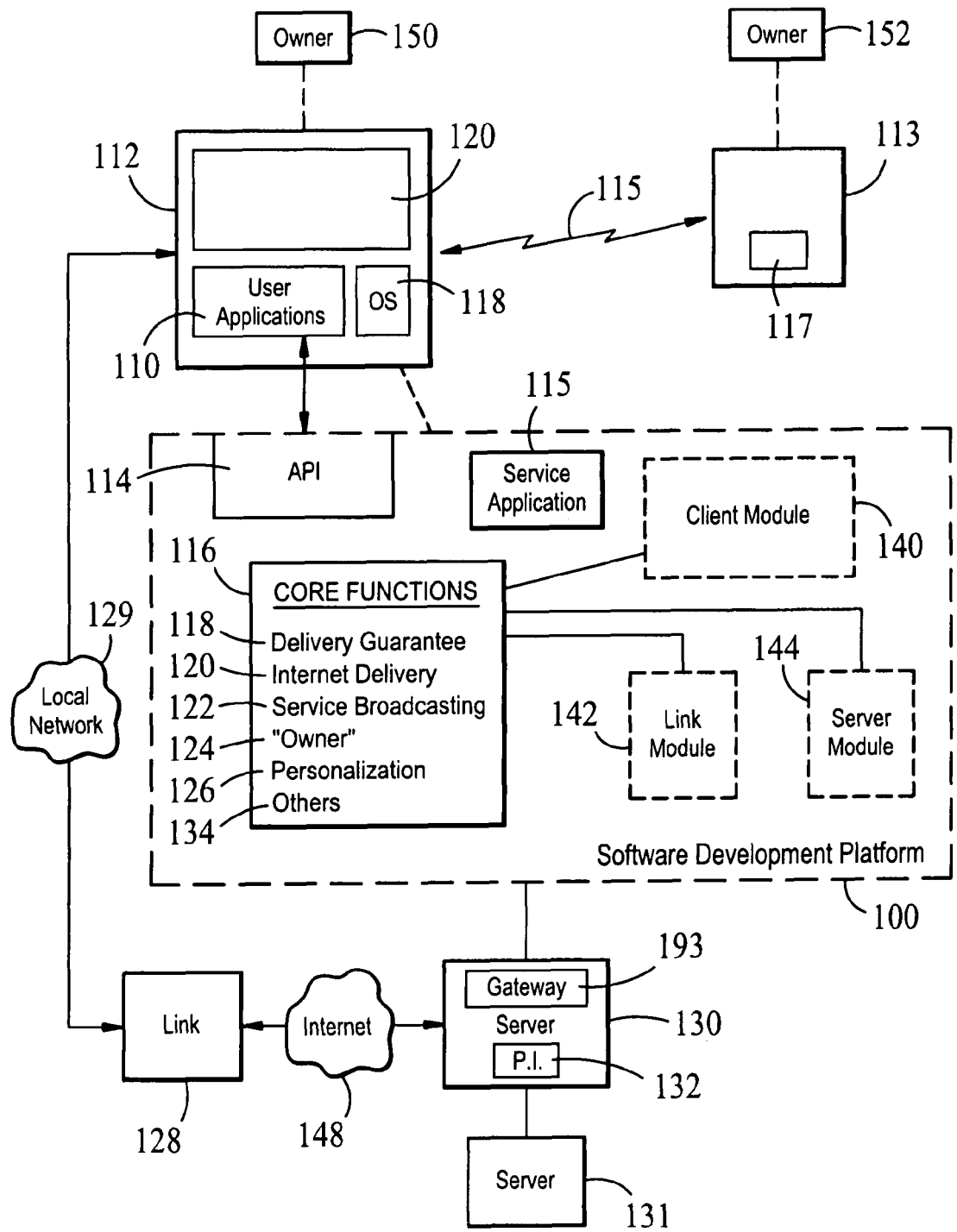

(51) Int. Cl.
*G01S 1/68* (2006.01)
*H04L 29/06* (2006.01)
*H04L 29/08* (2006.01)
*H04B 1/68* (2006.01)
*H04W 4/00* (2018.01)
*H04W 4/12* (2009.01)
*H04W 84/10* (2009.01)
*H04W 88/02* (2009.01)
*H04W 88/14* (2009.01)

(52) U.S. Cl.
CPC ............ *H04L 67/18* (2013.01); *H04L 67/303* (2013.01); *H04L 67/306* (2013.01); *H04L 69/329* (2013.01); *H04W 4/00* (2013.01); *H04W 4/12* (2013.01); *H04W 84/10* (2013.01); *H04W 88/02* (2013.01); *H04W 88/14* (2013.01)

(58) Field of Classification Search
USPC ............ 455/41.2–41.3, 414.2, 426.1, 456.3, 455/552.1; 705/14
See application file for complete search history.

(56) References Cited

U.S. PATENT DOCUMENTS

| | | | |
|---|---|---|---|
| 4,847,700 | A | 7/1989 | Freeman |
| 5,400,392 | A | 3/1995 | Nagashima et al. |
| 5,689,799 | A | 11/1997 | Dougherty et al. |
| 5,717,737 | A | 2/1998 | Doviak et al. |
| 5,774,664 | A | 6/1998 | Hidary et al. |
| 5,796,727 | A | 8/1998 | Harrison et al. |
| 5,872,526 | A | 2/1999 | Tognazzini |
| 5,907,322 | A | 5/1999 | Kelly et al. |
| 5,915,214 | A | 6/1999 | Reece et al. |
| 5,969,715 | A | 10/1999 | Dougherty et al. |
| 5,970,062 | A | 10/1999 | Bauchot |
| 6,018,654 | A | 1/2000 | Valentine et al. |
| 6,055,434 | A | 4/2000 | Seraj |
| 6,061,561 | A | 5/2000 | Alanara et al. |
| 6,072,520 | A | 6/2000 | Yuen et al. |
| 6,138,003 | A * | 10/2000 | Kingdon et al. ............ 455/410 |
| 6,204,796 | B1 | 3/2001 | Chan et al. |
| 6,204,885 | B1 | 3/2001 | Kwoh |
| 6,292,833 | B1 | 9/2001 | Liao et al. |
| 6,415,220 | B1 | 7/2002 | Kovacs |
| 6,484,148 | B1 | 11/2002 | Boyd |
| 6,549,625 | B1 | 4/2003 | Rautila et al. |
| 6,571,279 | B1 * | 5/2003 | Herz et al. .................... 709/217 |
| 6,603,977 | B1 | 8/2003 | Walsh et al. |
| 6,650,902 | B1 * | 11/2003 | Richton .................... 455/456.3 |
| 6,658,264 | B1 | 12/2003 | Irvin |
| 6,771,981 | B1 | 8/2004 | Zalewski et al. |
| 6,847,823 | B2 | 1/2005 | Lehikoinen et al. |
| 6,851,050 | B2 | 2/2005 | Singhal et al. |
| 7,069,248 | B2 | 6/2006 | Zalewski et al. |
| 7,164,885 | B2 | 1/2007 | Jonsson et al. |
| 7,171,221 | B1 * | 1/2007 | Amin et al. .................. 455/462 |
| 7,299,007 | B2 | 11/2007 | Eskin |
| 2001/0052849 | A1 | 12/2001 | Jones, Jr. |
| 2002/0032855 | A1 | 3/2002 | Neves et al. |
| 2002/0065713 | A1 * | 5/2002 | Awada et al. .................... 705/14 |
| 2002/0077060 | A1 | 6/2002 | Lehikoinen et al. |
| 2002/0078148 | A1 | 6/2002 | Hinde et al. |
| 2002/0095333 | A1 | 7/2002 | Jokinen et al. |
| 2003/0036350 | A1 | 2/2003 | Jonsson et al. |
| 2003/0055735 | A1 | 3/2003 | Cameron et al. |
| 2008/0039020 | A1 | 2/2008 | Eskin |
| 2008/0040272 | A1 | 2/2008 | Eskin |

FOREIGN PATENT DOCUMENTS

| | | |
|---|---|---|
| EP | 0 810 803 | 12/1997 |
| EP | 0848360 A1 | 6/1998 |
| EP | 1024628 A1 | 8/2000 |
| EP | 1 059 809 A | 12/2000 |
| GB | 2326314 | 12/1998 |
| JP | 2001-196955 | 7/2001 |
| WO | WO 98/37721 | 8/1998 |
| WO | 98/38589 A1 | 9/1998 |
| WO | WO 99/033293 | 7/1999 |
| WO | WO 99/60782 | 11/1999 |
| WO | WO 00/10296 | 2/2000 |
| WO | WO 00/60886 | 10/2000 |
| WO | WO 00/70504 | 11/2000 |
| WO | 00/75885 A1 | 12/2000 |
| WO | WO 00/74395 | 12/2000 |
| WO | WO 00/75911 | 12/2000 |
| WO | WO 00/79727 | 12/2000 |
| WO | 01/01711 A1 | 1/2001 |
| WO | WO 01/01711 | 1/2001 |
| WO | WO 01/63392 | 8/2001 |
| WO | WO 02/15074 | 2/2002 |
| WO | WO 02/15472 | 2/2002 |
| WO | WO 02/15527 | 2/2002 |
| WO | WO 02/062039 | 8/2002 |

OTHER PUBLICATIONS

Australian Office Action for Application No. 2002236938, dated Jan. 9, 2007.
Chinese Office Action for Application No. 02804496.7, dated Dec. 9, 2005.
Japanese Office Action for Application No. 2002-562067, dated Jan. 30, 2008.
Korean Office Action for Application No. 10-2003-7010227, dated Mar. 26, 2008.
Patent Abstracts of Japan, vol. 2000, No. 24, May 11, 2001, Abstract (English) of Japanese 1969.
Australian Office Action for Application No. 2007221827, dated Jun. 10, 2009, 2 pages.
Australian Office Action for Application No. 2007221825, dated Jun. 16 2009, 3pages.
Canadian Office Action for Application No. 2,437,706, dated Apr. 1, 2009, 3 pages.
Gehrmann et al., "Securing ad hoc services, a Jini view—extended abstract," Mobile and Ad Hoc Networking and Computing, 2000. Mobihoc 2000 First Annual Workshop on Aug. 11, 2000, Piscataway, NJ, USA, pp. 135-136 (XP010511744) (ISBN: 978-0-7803-6534-6).
Kolotyluk, "The Bluetooth beast in a Jini World," Bluetooth Signal, Jun. 1, 2000, pp. 6-7 (XP002224255).
Smith et al., "A Jini™ lookup service for resource-constrained devices," Network Appliances, 2002. Proceedings. 2002 IEEE 4th International Workshop on Jan. 15-16, 2001, Piscataway, NJ, USA, pp. 135-144 (XP010575045) (ISBN: 978-0-7803-7259-7).
Sun Microsystems Lab. Tech. Report, "Jini™ Architectural Overview," Jan. 1, 1999, pp. 1-21 (XP002941302).
Sutedja et al., "Applications of Jini Technology in Wireless Mobile Computing Environment," Tencon 200 Proceedings (IEEE Region 10 Annual Conference), Kuala Lumpur, Sep. 24, 2000, pp. 207-212 (XP000987977) (ISBN: 978-0-7803-6356-4).
Supplementary Partial Search Report for Application No. EP 02 70 3309, dated Dec. 15, 2009, 6 pages.
White, Ron, "How Computers Work," Millennium Ed., Que Corporation, Indianapolis, IN (1999).
Australian Office Action for Application No. 2007221827, dated Jul. 8, 2010, 3 pages.
Australian Office Action for Application No. 2007221825, dated Jul. 12, 2010, 3pages.
Canadian Office Action for Application No. 2,437,706, dated Apr. 14, 2010, 3 pages.
Chinese Office Action for Application No. 02804496.7, dated Jan. 15, 2010, 3 pages.
European Office Action for Application No. 02 703 309.1, dated Apr. 15, 2010, 5 pages.
Australian Office Action for Application No. 2011201040, 2 pages, dated Mar. 7, 2012.

(56) References Cited

OTHER PUBLICATIONS

Japanese Office Action for Application No. 2009-088801, dated Sep. 5, 2011.
Australian Office Action for Application No. 2007221827, dated Sep. 21, 2010, 4 pages.
Australian Office Action for Application No. 2007221825, dated Nov. 1, 2010, 2 pages.
U.S. Appl. No. 11/974,208, filed Oct. 11, 2007.
U.S. Appl. No. 11/974,094, filed Oct. 11, 2007.
Bakre, Ajay et al., "M-RPC: A Remote Procedure Call Service for Mobile Clients," Mobicom, pp. 97-110 (1995).
European Office Action for Application No. 02703309.1, 7 pages, dated Sep. 27, 2012.
Australian Office Action for Application No. 2011201041, dated Dec. 21, 2011.
Australian Office Action for Application No. 2011201041, 2 pages dated Mar. 13, 2012.
Canadian Office Action for Application No. 2,766,013, 3 pages, dated Apr. 18, 2012.
Australian Office Action for Application No. 2011201040, dated Dec. 16, 2011.
Australian Office Action for Application No. 2007221825, dated Feb. 24, 2011, 2 pages.
Australian Office Action for Application No. 2011201041, 3 pages, dated Jan. 24, 2013.
European Search Report for Application No. 12164262.3, 9 pages, dated Jul. 24, 2012.
Australian Office Action for Application No. 2011201040, 4 pages, dated Mar. 4, 2013.
Australian Office Action for Application No. 2011201041, 3 pages, dated Mar. 25, 2013.
Canadian Office Action for Application No. 2,766,013, 3 pages, dated Sep. 29, 2014.
Haartsen, "Bluetooth—The universal radio interface for ad hoc, wireless connectivity", Ericsson Review, vol. 3, pp. 110-117 (1998).

* cited by examiner

FIG. 3A

- LocalService {
    char * serviceName;
    int receive WhenRunning;
    int receive WhenNotRunning;
    int running;
    int maxNumOfMessagesToStore;
    char * exp_fld1;
    char * exp_fld2;
    char * exp_fld3;
    char * exp_fld4;
    char * exp_fld5;
  };

FIG. 3B

- RemoteService {
    char * serviceName;
    char * userName;
  };

FIG. 3C

- KMessage {
    char * serviceName;
    char * date;
    char * recipient;
    char * sender;
    char * messageBody;
  };

| Name | sendMessage |
|---|---|
| Arguments | char * to, char * serviceName, char * data |
| Return Values | int err |
| Description | This function provides sending capabilities so that messages or any kind of unformatted text can be sent between Bluetooth devices. Reception of the text is guaranteed, because even when the devices are not within range, the text is stored and communicated via an Internet connection. If a user is logged in to more than one device simultaneously, the message/text will be sent to both devices at the same time. |

FIG. 4A

| Name | getMessages |
|---|---|
| Arguments | struct KMessage * message |
| Return Values | int err |
| Description | The getMessages function retrieves all messages or any other formatted text sent from another Bluetooth device. It returns the data in the KMessage data structure.If a user is logged in to more than one device simultaneously, the message/text will be received from both devices at the same time. |

FIG. 4B

| Name | getMessage |
|---|---|
| Arguments | struct KMessage * message |
| Return Values | int err |
| Description | The getMessage function retrieves just one message or any other unformatted text sent from another Bluetooth device. It returns the data in the KMessage data structure.If a user is logged in to more than one device simultaneously, the message/text will be received from both devices at the same time. |

FIG. 4C

| Name | getSurroundingServices |
|---|---|
| Arguments | struct RemoteService areaServices [] |
| Return Values | int err |
| Description | This function returns an array of mappings of users and services available on that user's device. This information was previously stored in a database termed the registry, which is a list of devices within range of a Bluetooth device. |

FIG. 4D

| Name | AddService |
|---|---|
| Arguments | char * serviceName |
| Return Values | int err |
| Description | This function adds a service entry to the registry. |

FIG. 4E

| Name | RemoveService |
|---|---|
| Arguments | char * serviceName |
| Return Values | int err |
| Description | This function removes a service entry from the registry. |

FIG. 4F

| Name | changePMTdata |
|---|---|
| Arguments | <<waiting to hear about PMT API>> |
| Return Values | int err |
| Description | A function that allows users to update their personal PMT data and preferences using their particular devices. If the device is not within Bluetooth range of an Internet connection, it will restore these update preferences, and make changes within the permanent PMT upon coming into contact with an Internet connection. |

FIG. 4G

| Name | GetPMTdata |
|---|---|
| Arguments | char * user |
| Return Values | int err |
| Description | Allows a service to get the PMT data of a particular user from the PMT database. If the service cannot reach the PMT database, the information comes from the local storage on the device of the user. Only information that is designated as shared for public data will be retrieved. |

FIG. 4H

| Name | ChangePMTpermissions |
|---|---|
| Arguments | <<waiting to hear about PMT API>> |
| Return Values | int err |
| Description | This function allows a user to change his PMT permissions from his device. |

FIG. 4I

MOBILE COMPUTING AND COMMUNICATION

CROSS-REFERENCE TO RELATED APPLICATIONS

This application is a divisional continuation of and claims priority to U.S. patent application Ser. No. 09/775,194, filed Feb. 1, 2001, now U.S. Pat. No. 7,299,007, which is incorporated here by reference.

BACKGROUND

This invention relates to mobile computing and communication.

Personal digital assistants, mobile telephones, and other mobile devices offer a wide range of computing and communication capabilities. To provide these capabilities, mobile devices have hardware complements that may include microprocessors, memories, displays that are in some cases touch sensitive, microphones, speakers, keys, and other user input and output mechanisms.

A variety of specific functions are often provided on mobile devices, including data entry, handwriting recognition, speech recognition, voice and data communication, memo writing, calendars, word processors, spreadsheets, to-do lists, and address books. These functions are implemented in software or firmware applications that are stored on the devices and use the features of an operating system such as Microsoft Windows CE or Palm OS that runs on and controls the hardware components of the mobile devices.

Mobile devices that are capable of wireless communication typically comply with one or more of the standard wireless communications protocols such as Bluetooth and the Wireless Application Protocol (WAP).

Bluetooth, for example, uses radio frequency transmission for relatively short-range communication. Bluetooth capabilities may be implemented in a small microchip that is incorporated into the mobile or other device.

To create an application for Bluetooth-capable devices, a developer typically writes custom software that implements the particular features of the application. A piece of custom software must be written for each of the devices that are involved in performing functions of the application on either end of each Bluetooth communication link. Each piece of custom software is written to conform to the peculiar hardware and operating system characteristics of the device on which it will run.

SUMMARY

The invention enables a fundamental shift in the way developers can enable users of mobile devices to interact with users of other mobile devices and users of stationary devices that have wireless capability.

In general, in one aspect, the invention features a method that includes running client modules on mobile devices, running a server module on a server that is accessible through a communication network, and running link modules on link devices that have communication channels to the mobile devices and are capable of accessing the server through the communication network. The client, server, and link modules provide core services through application programming interfaces to applications running on the mobile devices, the server, and the link devices.

Implementations of the invention may include one or more of the following features.

Service applications also run on the client modules to enable users of the mobile devices to manage the core services. The core services include interaction with short-range wireless transceivers in the mobile devices. A mobile device operating system is also running on the mobile devices and the client modules use services of the operating system. The mobile devices include personal digital assistants or mobile phones. The core services include at least one of the following: broadcast of information about real-world services; interaction with a wireless transceiver in the mobile device; guaranteed message delivery; and encryption.

In general, in another aspect, the invention features a method that includes running client modules on wireless devices, the client modules providing core services through application programming interfaces to applications running on the devices, at least some of the applications being associated with real-world services that are provided by individuals or enterprises.

Implementations of the invention include one or more of the following features. Information is maintained identifying relationships between each of the real-world services and at least one of the devices through which the service is provided, the core services providing a sharing among the devices of the information identifying the relationships between the real-world services and the devices. Information about the services available through each of the devices is broadcast by the core services to the other devices. The real-world services associated with the devices are registered by the core services. The real-world services include at least one of communication services, computational services, commercial services, or governmental services.

In general, in another aspect, the invention features maintaining in a wireless device a list of real-world services that are available from a user of the device through an application running on the device; and through a wireless communication channel, broadcasting information from the device indicative of the available real-world services.

Implementations of the invention include one or more of the following features. The information is broadcast periodically. Another wireless device that receives the broadcast information accesses one of the available real-world services.

In general, in another aspect, the invention features a method that includes running client modules on mobile devices that are associated with identified users, running a server module on a server that is accessible on a communication network, and running link modules on link devices that have communication links to the mobile devices and are capable of accessing the server through the communication network.

Implementations of the invention include one or more of the following features. A message is received from a user of one of the mobile devices through one of the applications running on the device, the message being directed to another user of an application running on another one of the mobile devices, and the message is delivered to the other user through the Internet. The message is sent through the links and the server. The client module running on the device from which the message is sent determines whether the target mobile device is within short-range wireless distance, and, if not, the client module forwards the message to one of the link modules. The link module forwards the message to the server through the Internet. The server module determines the location of the target mobile device and identifies a communication channel through which to forward the message to the other user.

In general, in another aspect, the invention features a method that includes maintaining a list of short-range wireless devices within range of a first short-range wireless device; and transmitting a message from an identified user of the first device to a second identified user of a second wireless device over a communication medium, the communication medium being selected based at least in part on whether the second device is included on the list, the selection being transparent to the user of the first device.

Implementations of the invention include one or more of the following features. If the second device is included on the list, the message is transmitted to the second device over a short-range radio link, and if the second device is not included on the list, the message is transmitted to the second device using another communication medium. If the second device is not included on the list, the message is transmitted to the second device over either the Internet or by mobile telephony.

In general, in another aspect, the invention features a method that includes transmitting a message from an identified user of a short-range wireless device to an identified user of another device; and automatically confirming to the identified user of the first device whether the transmitted message was received by the identified user of the other device.

Implementations of the invention include one or more of the following features. Information is stored about the transmitted message in the first device after transmission; and a match is made between received confirmations and the transmitted message stored in the device. The transmitted message is resent if a confirmation for the transmitted message is not received within a specified period. A communications manager is notified in the first device if the transmitted message is undeliverable. The notifying includes providing an explanation of why the transmitted message was undeliverable. The transmitted message is removed from the device after it is confirmed that the transmitted message was received by the identified user of the other device. The device from which the message is transmitted is responsible for guaranteeing the delivery.

In general, in another aspect, the invention features a method that includes running applications on devices that are associated with respective owning entities, sending a message from an initiating owning entity to a target owning entity using one of the applications running on one of the devices associated with the initiating owning entity, identifying one of the devices as being associated with the target owning entity and as being accessible by a communication link, and forwarding the message to the device that is associated with the target owning entity through the communication link.

Implementations of the invention include one or more of the following features. Each of the devices runs a client module that encrypts and decrypts the message using a public key associated with the owning entity of the device. The public key is stored in the device and in a server through which the message passes. The device comprises a mobile device. The owning entity comprises a person. The owning entity comprises an enterprise and the device comprises a stationary device.

In general, in another aspect, the invention features a method that includes (a) storing information that identifies real-world entities and defines modes of interaction by the real-world entities through distributed devices, each of the real-world entities providing services to other real-world entities and using services of other real-world entities, (b) enabling any of the real-world entities using any arbitrary one or more of the distributed devices to log into the server, (c) loading portions of the stored information from the server to the device being used, and (d) regulating the interaction of the real-world entity using the device with other real-world entities based on the stored information, the interaction including the use of the services of the other real-world entities.

Implementations of the invention include one or more of the following features. Client modules are run on the device, a server module is run on a server that is accessible on a communication network, the client and server modules provide core services through application programming interfaces to applications running on the devices, and the core services include access to the information that is stored on the server and relates to real-world entities. The stored information includes at least one of identification information, demographic information, and preference information.

In general, in another aspect, the invention features a method that includes associating with each one of a number of different mobile devices that have a short-range wireless communication capability, a person who is a user of the device; storing information about the association of devices and users and information about each of the users at a publicly accessible server; and providing services at each of the mobile devices that depend on the information about the user of the device that is stored at the server.

Implementations of the invention include one or more of the following features. The information about the users is communicated to the devices from the server for use in providing the functions. The information about the users includes at least one of: demographic information, identification information, preference information, or location information. At least some of the information about the users is stored on the mobile devices associated with the users.

In general, in another aspect, the invention features a method that includes recognizing automatically that an entity in possession of a short-range wireless device is within a particular geographic area; obtaining data about the entity from a commonly accessible database; and sending information to the short-range wireless device, the information sent to the device depending on the data obtained from the database.

Implementations of the invention include one or more of the following features. Access to the data about the entity in the commonly accessible database is contingent on permission of the entity. The entity can access and modify its data in the commonly accessible database using the wireless device. A second short-range wireless device recognizes that the entity is within the particular geographic area, obtains the data, and sends the information. The information sent to the first device includes promotional material for facilitating a transaction with an entity associated with the second device. The entity obtains information about an entity associated with the second device from the commonly accessible database using the first device. Recognition that the entity is within a particular geographic area is based on receipt of a message from the first device, the message including an identification code mapped to the entity.

In general, in another aspect, the invention features a method that includes (a) electronically storing, in a publicly accessible location, information about real-world entities that are users of devices that have short-range wireless communication capability, (b) providing client modules on the devices and a server module at the publicly accessible location, the client modules and the server module cooperating to provide guaranteed messaging between users of any of the devices and to enable commercial transactions between users of the devices based on the electronically stored information.

Implementations of the invention include one or more of the following features. One of the two wireless devices is fixed and one of the two wireless devices is mobile. The user of one of the devices comprises a commercial entity. The user of one of the devices comprises a consumer. The transaction comprises delivery of marketing information from one of the two devices to the other. The transaction comprises the use by one of the two devices of a service provided by means of the other of the two devices. The transaction comprises electronic messaging. The transaction occurs when the two devices are out of range of each other. Access to the stored information is under the control of the user to which it pertains. The stored information comprises the location of the user. The stored information comprises consumption preferences of a consumer. Each of the users is associated with more than one of the devices. The transaction is effected between the two users through the server that is located out of range of the two devices. The two devices are in range of each other and the transaction is effected between two users carrying the two devices. The transaction comprises sending an electronic business card from one of the devices to another one of the devices and displaying the card on the other one of the devices. The transaction comprises an electronic message communicated from one of the users to the other through at least one of the two devices and by a route that includes a mode of communication that is selected from among the Internet, mobile telephony, and short-range wireless communication, the selection being made without the user's awareness.

In general, in another aspect, the invention features a method that includes, at a first device, receiving information from a second device through a short-range wireless communication channel, the information identifying an actual geographic location of the second device based on signals received from GPS sources, and updating a derived geographic location stored at the first device based on the information received from second device.

Implementations of the invention include one or more of the following features. The derived geographic location is updated to be the same as the actual geographic location of the second device. The first device receives information over time from multiple other devices, the information representing the actual GPS geographic locations of the other devices, and the derived geographic location is updated from time to time based on the information received over time from the other devices. The first device is mobile and the second device is stationary.

Other features and advantages will become apparent from the following description and the claims.

DESCRIPTION

Figure 2:
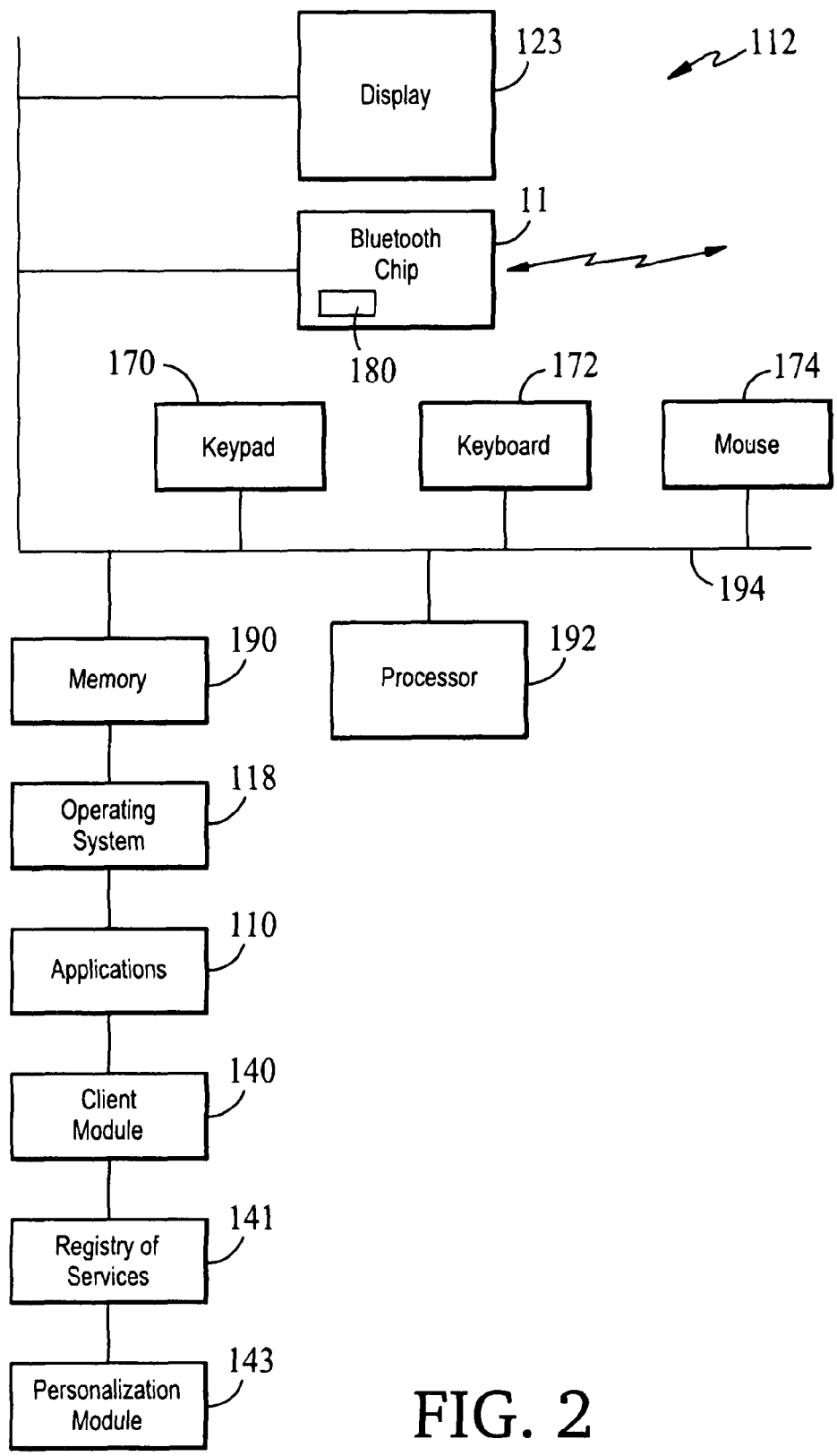
Figure 5:
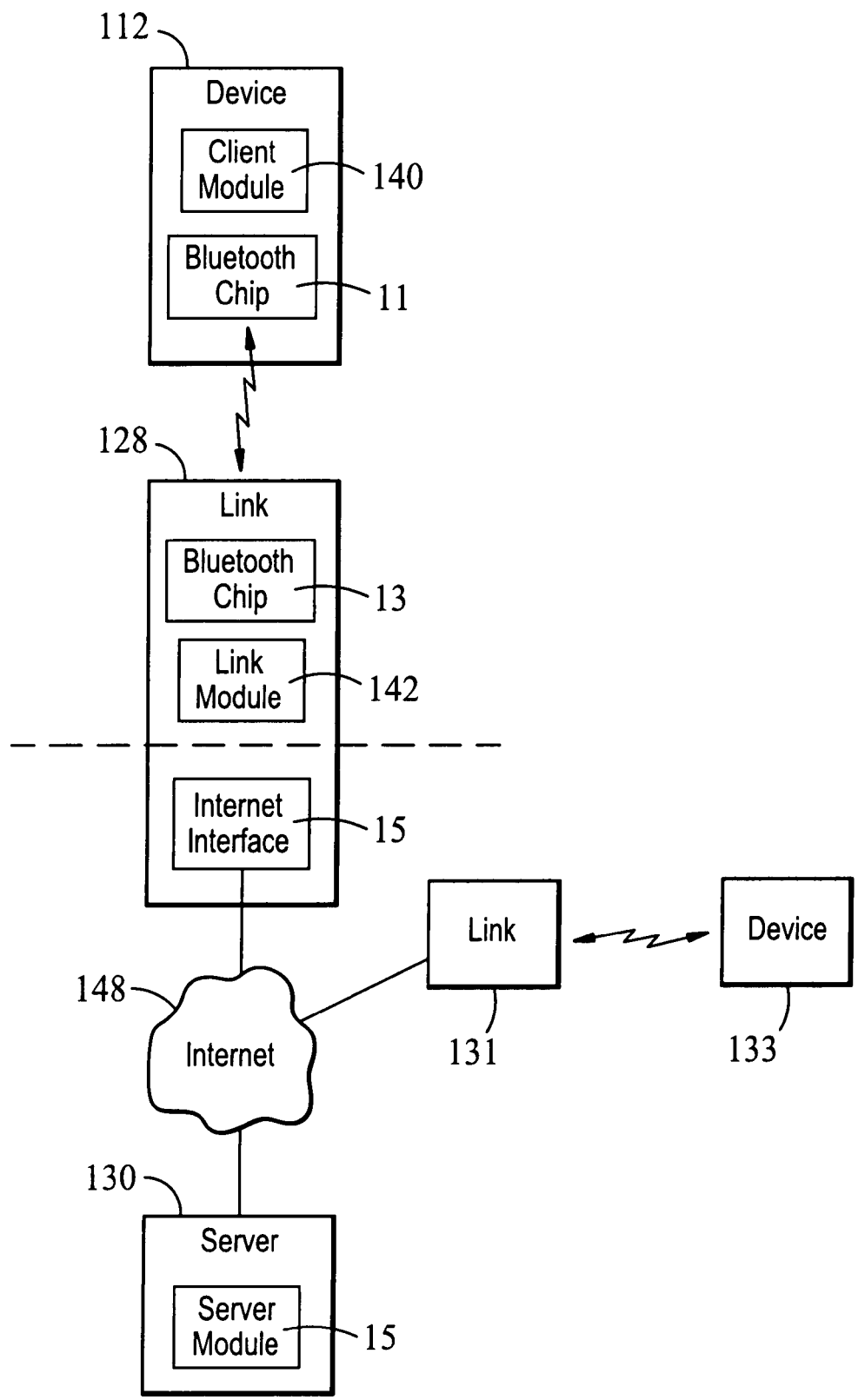
Figure 6:
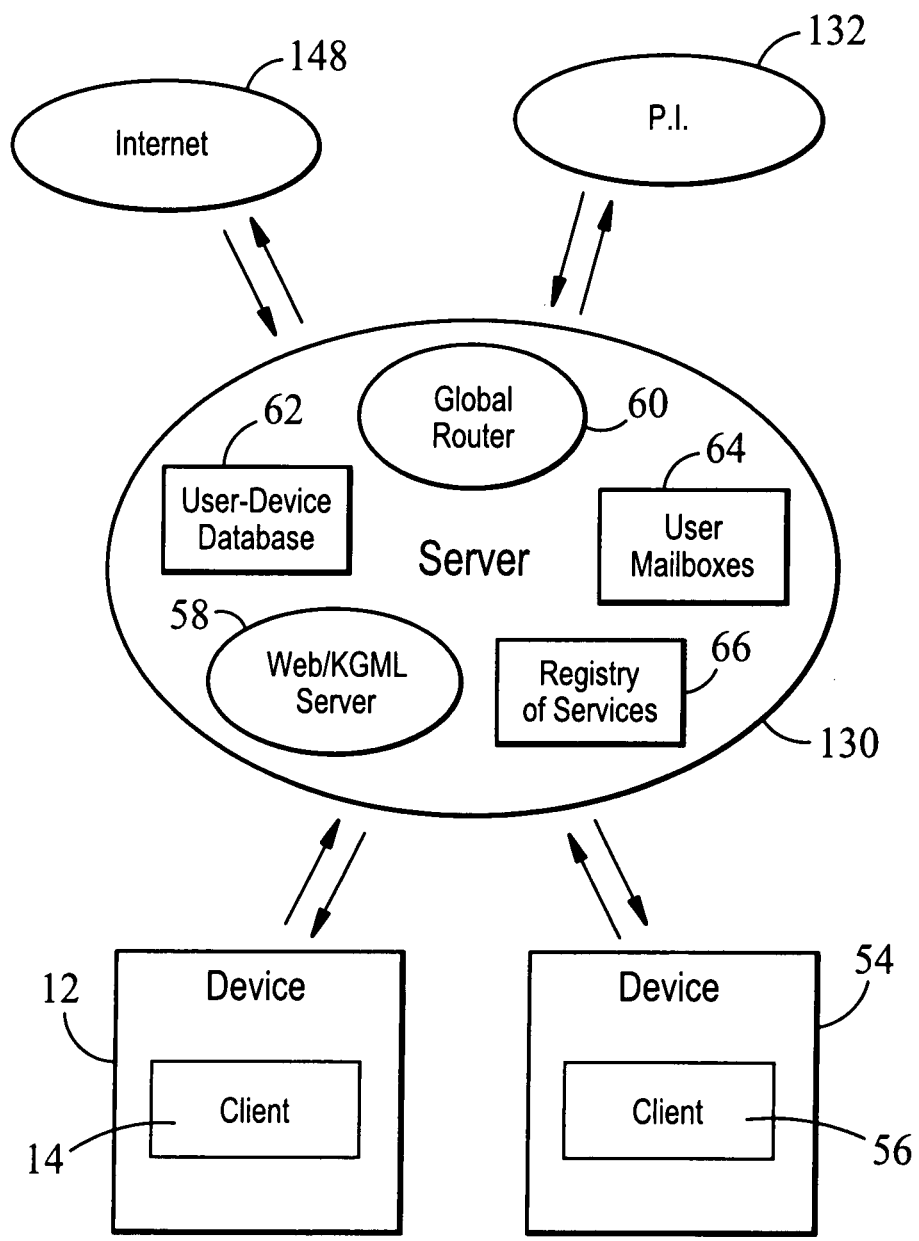
Figure 7:
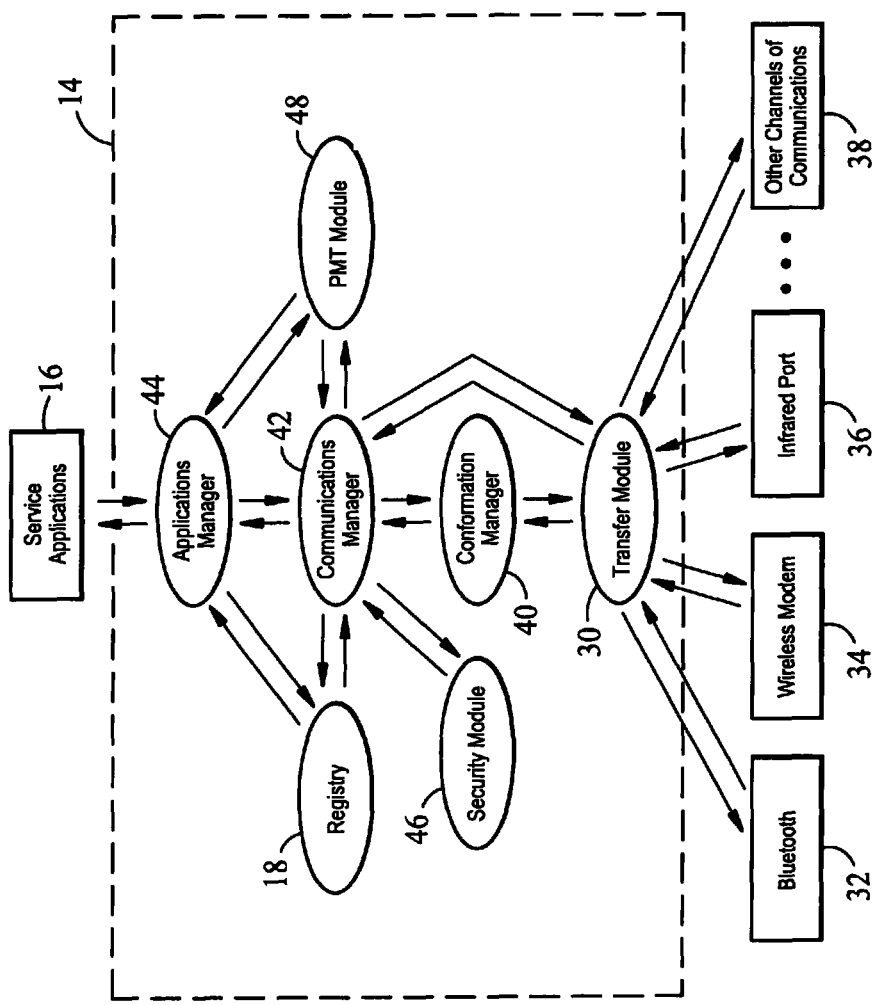
Figure 8A:
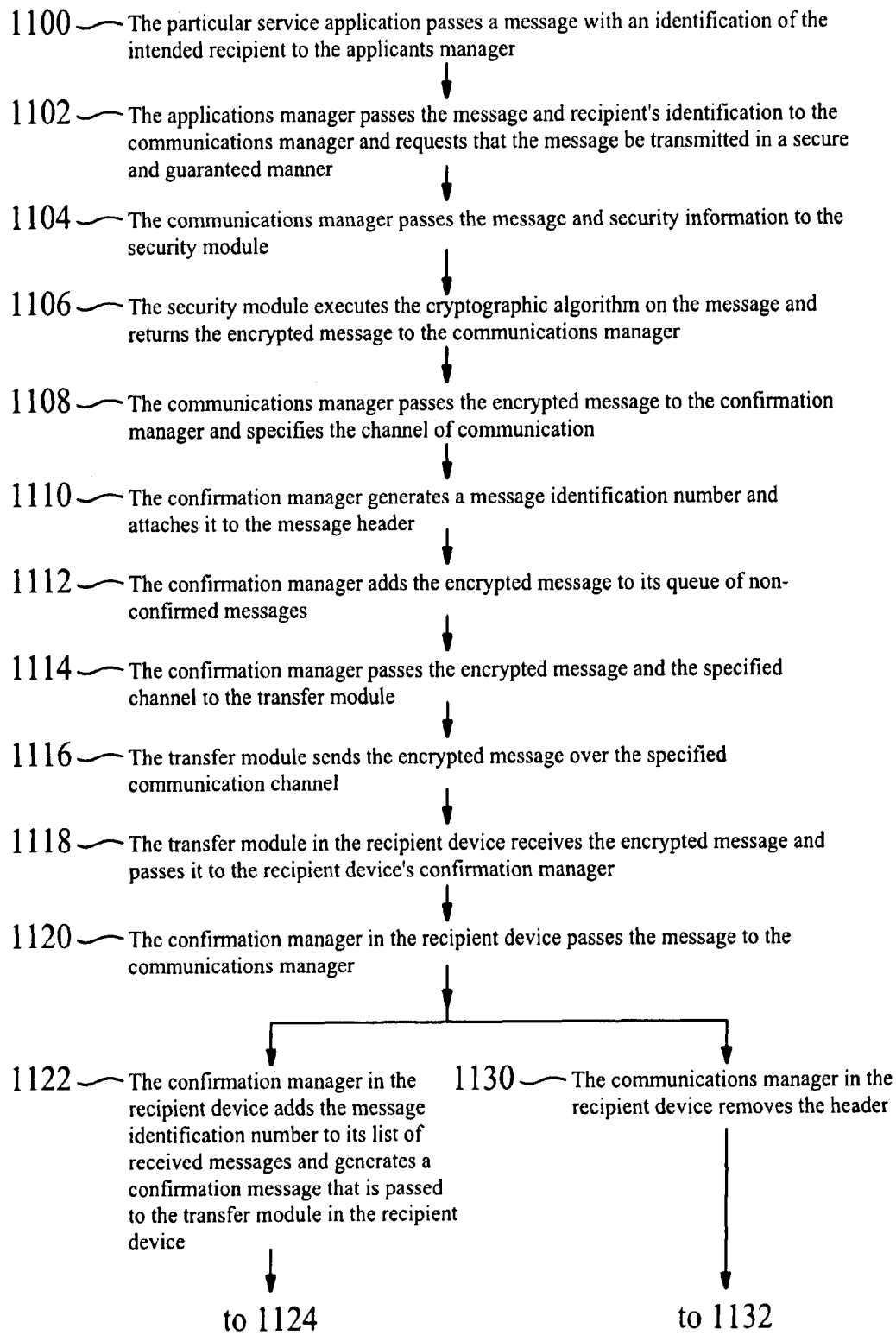
Figure 8B:
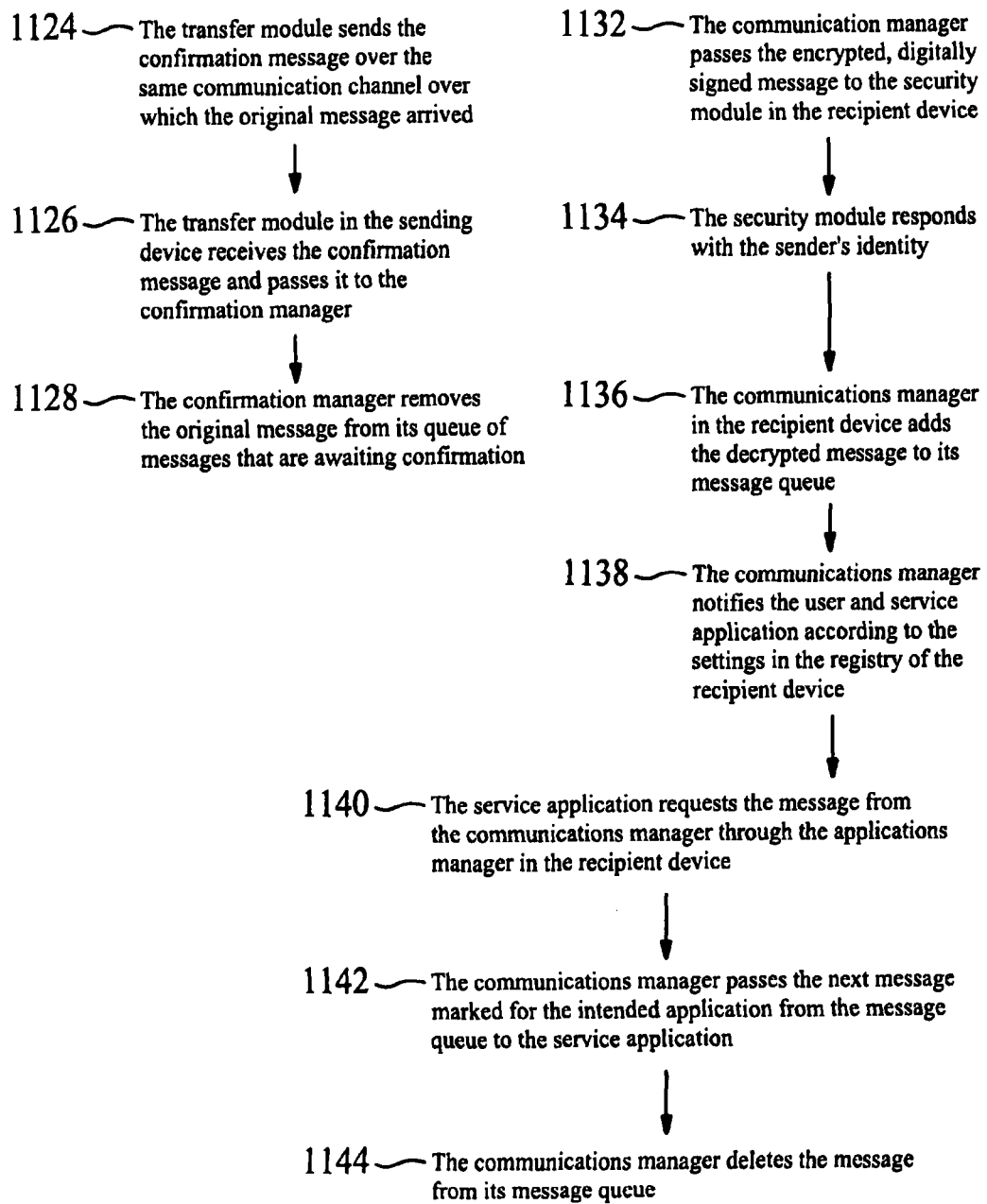

FIG. 1 shows a communication system.
FIG. 2 shows a wireless mobile device.
FIGS. 3A, 3B, and 3C show data structures.
FIGS. 4A through 4I show functions that can be used by a wireless device.
FIG. 5 shows communication paths.
FIG. 6 shows a server.
FIG. 7 shows a client.
FIGS. 8A and 8B show a method for wireless communication.
FIG. 9 through 14 show uses of the system.

OVERVIEW

One general aspect of the invention is an application development platform that includes client, link, and server modules that expose core services through an application programming interface (API). Applications can be easily built on the API. The core services are selected to enable unique and widely useful applications to be created.

Each of the applications can make services available to local and remote devices on which the client modules run. The availability of services is broadcast and known to the mobile devices, links, and services so that devices throughout the system can take advantage of them.

One core service is message delivery. The client, link, and server modules coordinate their activities to guarantee at a high level the delivery of messages initiated by applications running on the mobile devices. Messages may be sent directly by a short-range wireless channel from a mobile device to another mobile device that is in the vicinity. If the target device is not in the vicinity, the message may be sent through other channels, including the Internet, to the target device. The communication channel can be chosen transparently to the user of the originating device.

Each device in the system can be associated with an "owner", which can be a person or an entity, such as a retail establishment. Information can be stored that links devices to owners so that messages, for example, can be directed to an owner. The system will determine the identity and location of a device associated with the owner. The message will then be sent to the identified device wherever it is located using whatever communication channel is appropriate.

Information associated with each of the owners of devices can be stored centrally and used in providing the services at each of the mobile devices. For example, information about the owner's preferences or characteristics can be used to govern the manner in which services are provided, information is made available and communications are effected.

The system can be used to provide virtual GPS capabilities for mobile devices that do not include GPS chips. Such a mobile device can obtain actual GPS information from other devices in the vicinity using short-range wireless communication. The mobile device can maintain a virtual GPS location that is nearly as accurate as if it had the GPS chip on-bard.

As shown in FIG. 1, the invention provides a common software development platform 100 that enables developers to easily, quickly, and effectively build a wide range of user applications 110 for devices 112, including mobile devices, that have short-range wireless communication capabilities, such as those provided by the Bluetooth standard. The common software development platform provides core functions and features 116 that can be invoked by the user applications through an API 114.

This architecture enables the developer to provide functions and features that are especially suited to mobile devices and short-range wireless communication and that have extremely broad appeal to users of the mobile devices. The developer need not re-invent, for each type of device and each communication protocol, the manner in which the applications interact with the operating system 118 running on the device, the device hardware 120, and the communications protocols.

The core functions include
  providing a high-level guarantee of message delivery from one device to another 119
  a delivery service that transparently arranges for the delivery of messages from one user to another through, e.g., the Internet 148, if the two devices are not within short-range wireless communication distance of each other 120 broadcasting of available services by a device and use of information that is broadcast from other devices 122 associating an "owner" with each device 124, and integration with information associated with the owner 126.

The applications may enable both person-to-person interaction and person-to-location interaction, which involves a person interacting with an institution or real-world location or enterprise such as a store or airport.

The devices need not be mobile, but may include stationary devices that are to be part of the communication, including personal computers, cash registers, servers, and parking meters, to name a few. The platform extends to the hardware and software that provides a link 128 between the mobile devices and other devices, including a central servers 130, that are not within direct reach of the short-range wireless communication capabilities of the mobile device.

Based on the common development platform and the API that it presents to developers, any developer can easily create applications that change the way individuals interact with one another and with their environments.

The platform enables a developer to easily create applications that do virtually any job that requires local communication between devices (including mobile devices) 112, 113, or longer-distance communication between local devices and central servers. Because the platform encompasses servers, it also enables a developer to use personalization information 132 that is stored on a server to personalize the operation of applications that are running on local devices.

The core functions exposed by the API include functions that are expected to be used by a large proportion of applications that are built on Bluetooth. The application developer can build other features and functions 134 into his application and can supplement and expand the core functions.

In addition to the initial ease of creating the applications, the use of a common development platform leads to applications that are inter-compatible, more uniform, and more standardized.

The common development platform includes a client module 140, a server module 144, and a link module 142. The client module runs on a client device 112, such as a mobile device or a stationary local device owned by a merchant or a consumer. The server module runs on a server 130 that is typically not within short-range communication distance of the client devices, and the link module runs on a device 128 that provides a link between one or more client devices and the servers.

"Owner" of a Device

Conceptually, each client device has an "owner" 150, 152. In a simple example, the owner is a person who owns and uses the device, say the owner of a Palm Pilot with Bluetooth capability. Another example of an owner would be a restaurant operator with respect to a Bluetooth-capable client cash register at a restaurant. The owner of a device is known to the client, server, and link modules. An owner may change, for example, when a person lends his mobile telephone to another person.

The system stores information about the owners of the devices in a centralized database 132 to which one or more servers 130, 131 have access. The information could include names, addresses, and billing information, and other information such as the current location of the person and his current telephone number. The information could also include demographic information and user-entered preferences about products, services, and user interfaces.

One benefit of having the information accessible to the servers and clients is that it becomes possible for one party at one location to communicate with an owner located anywhere in the world even if, on one occasion, the communication is by Bluetooth, on another occasion by mobile telephony, and on another occasion through the Internet 148. The initiating party need not know where the owner is located or how to reach him; the server is aware of that information and can forward the message through the link to a server and from the server through an appropriate medium to the owner.

By combining the features of centrally stored information with easy-to-develop applications for mobile devices, it is possible to create a broad range of portable, standardized applications that make fundamental changes in the way people interact with the world around them.

Broadcast of Services

The development platform 100 includes a function that enables an application 110 running on a mobile device to broadcast information about services that it provides to other devices running applications. Conversely, an application is able to identify and learn about services that are made available by applications running on other devices, for example, devices that are within short-range wireless communication and devices that are accessible through the link module. The service-broadcasting capability enables the creation of a fabric of millions of devices (mobile devices, central servers, links, and others) that provide and use services, where a person's mobile device can be kept aware of available services as it moves through a world populated by the other devices.

Personalization

Because the client, link, and server provide the basic core capability of finding, storing, and editing personalization information in a central database 132, the applications built on the modules can provide functions that are dependent on the personalization information for the "owner" of the device.

Guaranteed delivery

Another of the key core functions provided by the application development platform is so-called high-level guaranteed delivery of messages. When an application running on a device such as a mobile PDA initiates a message to another device anywhere in the world, the modules guarantee delivery of the message even if the other device is not within short-range communication and even if the other device is not in use at the moment. To do this, the modules determine the location of the target device, determine an appropriate mode of communication (e.g., a Bluetooth communication to a local device followed by a link to the Internet and then a telephony link to the target device) and track the message until delivery has occurred.

The Internet can be used as a transparent alternative to Bluetooth for message delivery. When a user of an application on a device takes a step that requires a message to be sent to another device, the message can be sent through the Internet at the election of the modules, without the user being aware that Bluetooth is not being used.

The Wireless Device

As shown in FIG. 2, the client device 112 can be a wireless device that has a Bluetooth chip 11 enabling it to communicate over short-range radio links (such as link 115, FIG. 1) with another chip 117 (FIG. 1) in another device in accordance with the Bluetooth protocol. The device 112 could be, for example, a mobile telephone, personal data assistant (PDAs), handheld computer or organizer, personal computer, cash register, parking meter, or other device. The device can include a touch-sensitive display 123 to allow the user to view information and interact with the device, a keypad 170, a keyboard 172, a mouse 174, or other means for allowing the user to interact with the device.

The chip 11 has a unique identification code 180 that is mapped in the personalization database 132 to the user or owner of the device. The user of the device may be an individual, vehicle, or other mobile entity, or may be an entity whose location is fixed such as a store or restaurant.

Generally, the device 112 also has a memory or memories 190 that store an operating system 118, applications 110, and the client module 140, a processor or processors 192, and one or more internal system communication buses 194 interconnecting these hardware components (the hardware components are together identified by the numeral 120 on FIG. 1).

Interaction between the Bluetooth chip, on one hand, and the operating system, the client module, and the applications, on the other hand conforms to a Bluetooth API that is exposed by the chip to the devices that interact with it. By making calls to the chip 11 through the client module, application programs 16 created by a variety of parties and running on the device 112 can achieve a broad range of functions. By interacting with the operating system 118 of the device 112, the client module 140 can take advantage of the communication, processing, display and user interaction features provided by the operating system.

Tracking Available Services

The client module 140 keeps a registry 141 of services that are available from the applications running on the local device 112 and services that are available from applications running on other devices, including devices that are within short-range wireless distance of the local device 112.

An entry in the registry related to a service may have the format shown in FIG. 3A for a locally available service and the format shown in FIG. 3B for a service available on another device. Other formats could be used.

Exemplary services that could be made available by applications running on devices include a WML server or an instant messaging client.

The platform exposes "AddService" and "RemoveService" functions (see FIGS. 4E and 4F) that can be used by applications to add (register) or remove (unregister) services from the list in the registry 141.

The client module makes information about the user (owner) of a device and the services available from that device by a periodic broadcast ping to all devices within range of a local device. The broadcast function allows numerous devices constantly to be aware of a range of services offered by other devices. Each device can take advantage of and use a wide range of services for the user's benefit. The client module uses the information stored in the registry 141 by the applications to provide other devices with descriptions of services and instructions on how to access them.

The applications running on the device can include core service applications that enable user interaction with and control of functions provided by the client module.

One service application, for example, may enable a user of the device to modify the contents of the registry and to specify preferences with respect to the services available on the device. For example, the user may choose whether or not to be notified when a message is received for a particular service.

Message Passing Through the Link

In addition to communicating with nearby wireless devices, the client module can access the Internet or other public network through a link 128 (FIG. 1) that is running a link module 142. Any device having local network capabilities 129 and an Internet 148 connection can serve as the link. The link could be a mobile device or a stationary device.

As shown in FIG. 5, in some implementations, the link 128 includes a device with a Bluetooth chip 11 that provides local network capabilities (as defined in the Bluetooth standard), a copy of the link module 142, and an Internet connection through an Internet interface 15, such as a dialup or dedicated connection to the Internet 148.

Some communications can be sent over the Internet as a transparent alternative to sending the messages using Bluetooth technology. The link 128 allows users within short-range wireless distance to send and receive data through the Internet to and from, for example, server 130 running a copy of the server module 144. Other technologies such as infrared could also provide the local network capabilities for the link 129.

The client module tracks whether there are any links 128 in range of the device based on information stored in the service registry 18, because the links broadcast their available services in the manner described earlier. Messages destined for devices that are not within range are stored by the client module in a queue until the device is within range of a link 128.

In one example, messages (called Kmessages) stored in the client's message queue have the format shown in FIG. 3C. Once the device is within range of a link 128, the messages are transmitted through the link to a server 130. The server 23 can then transmit the messages to another link 131 (FIG. 3) that is close to the target device 133. A registry in the target device stores messages waiting to be retrieved by specific services on the device.

The "getMessages" and "getMessage" functions (shown in FIGS. 4B and 4C) are exposed by the client module and enable an application running on the client device to be used to retrieve messages sent from other devices. The stored messages are communicated from the client to an application using the Kmessage structure shown in FIG. 3C.

The core services of the modules support the Transport Control Protocol/Internet Protocol (TCP/IP) to allow for Internet connectivity through what amounts to an ad hoc network of the devices that are within the vicinity of the links. IP masquerading is used by the link module to assign an IP address to each device in range of the link, thereby enabling the devices to communicate using TCP/IP.

The Server

The server module 144 running on the server 130 allows users of devices anywhere in the world to send messages to one another without knowing where the recipient is located or which device the recipient is using.

As shown in FIG. 6, the server system 130 serves as a global router 60 that exposes services to server applications to enable messages to be stored and passed, for example, between a device 12 on which a client module 14 resides and another device 54 on which another client module 56 resides.

In general, a given user may be an owner of multiple devices and may log on to some or all of them at one time. The server module includes a database 62 that tracks the devices associated with each user. The server module can support the HyperText Transfer Protocol (HTTP) and WAP, as well as other technologies, to send and receive messages.

In one implementation, the server module includes software written in the Java computer language that can run, for example, on a Windows, Solaris or Linux system. The server module also can store information about the services that are made available by each of the user's devices in a registry of services 66 so that other devices can locate and access the services. A "getSurrounding Services" function (shown in FIG. 4D) is exposed by the client module to applications running on a device to enable the devices to obtain from the server module an array of mappings of users of other devices and services available on their devices.

Personalization

The server module also provides an interface service to the personalization system 132 and a gateway service 173 to other technologies such as the Internet 148. A web server 58 using, for example, a Generalized Markup Language, allows messages to be served to any mobile device that has an Internet connection. In addition, any client device can access resources and information from the server through the Internet.

The user can log on to the server, for example, to access the personalization system 26 and to enter or edit personalized information.

On of the service applications 115 (FIG. 1) provided with the client module 14 allows the user to modify personal information and preferences stored by the personalization system. A "changepersonalizationdata" function (shown in FIG. 4G) can be used for that purpose. The user also can set indicators to permit or deny access by other users to various pieces of data stored in the personalization system and associated with that user.

For example, user information stored in the personalization system may be designated as shared or public using the "Changepersonalizationpermissions" function (shown in FIG. 4I).

One of the service applications running on one user's device can access other users' profiles from the personalization system using a "Getpersonalizationdata" function (shown in FIG. 4H). Access is denied if a particular user does not have permission to access another user's profile. All relevant data from the personalization system is loaded dynamically through a link when the user logs on to the server. Thus, user information stored at the client device can be updated regularly to keep it synchronized with the data stored in the personalization system.

An administrative graphical user interface (GUI) is associated with the server to allow an administrator to change configurations for users manually. The administrative GUI also allows an administrator to analyze the load on resources used by the server, test and debug the server, and access user information stored in the personalization system if the user permits such access.

Guaranteed Delivery

In general, the client module exposes a service that is responsible for ensuring delivery of messages from one device to another. Upon receipt of a message from an application, the client module returns a confirmation including a unique identification number for each transmission of data. If the client module is not able to guarantee that a message was delivered, the text of the message is returned to the sender, with a message indicating that the text was undeliverable. If a message including data is received by a device that does not have the necessary application to operate on the data, then the message is returned to the sender. On the other hand, if the required application is listed in the registry of the recipient's device, but the recipient's device is not currently running the application, the client module stores the message and notifies the user that the message has been received.

When a message is sent to a particular user from the server through the links, the message is sent to all devices that the user "owns" and on which he is logged on. If the user is not logged on to any of his devices, the server module stores the message in a mailbox database 64. When the user subsequently logs on, he is notified of the message. Therefore, when a message is to be sent to a particular device, the sender of the message need not determine which device the recipient is closest to or on which device the recipient prefers to receive messages. The server transparently routes the message to the proper device. Because encryption technology is integrated with the client module, the user automatically digitally signs communications using a global key stored in the personalization system and in a personalization module 143 stored on the client device (see FIG. 2).

As shown in FIG. 7, the client module includes a transfer module 30 that provides an interface to communications media, including the Bluetooth chip 32, a wireless modem 34 that permits mobile telephone communications, an infrared port 36, or other communications channels 38.

The transfer module 30 references a socket or equivalent layer of each communications media available to the device and manages the communications media. The transfer module 30 passes received messages to a confirmation manager 40 and provides information to the communications manager about the available communications media. The transfer module 30 can be requested by the confirmation manager 40 to send messages over a particular communication medium.

The confirmation manager 40 is the portion of the client module that is responsible for guaranteeing delivery of messages. It maintains a queue of outgoing messages, as well as a queue of messages awaiting confirmation. The confirmation manager 40 tracks messages that have been sent and matches received confirmations with the original outgoing messages. If confirmation is not received within a specified period, the message is re-sent.

The confirmation manager 40 can be called upon by a communications manager 42 to send messages and notifies the communications manager if a message is undeliverable. A message explaining why a message is undeliverable can accompany the notification to the communications manager 42.

The communications manager 42 is responsible checks for other devices entering or leaving the range of the device and decides which communication medium to use when a service application 16 requests that a message be sent. Messages can be sent to a security module 46 for encryption and receipt of a digital signature.

The communications manager 42 is notified by the confirmation manager 40 of received messages and passes the received messages to the security module 46 for authentication of digital signatures. User name and security information is received from the personalization system through a personalization module 48. The communications manager 42 notifies the service applications 16, through an applications manager 44, of received messages based on settings in the local registry 18. The service applications 16 then can retrieve messages in a message queue through the applications manager 44.

The communications manager 42 also receives and acts upon registry request messages and broadcasts and retrieves local service application settings from the registry 18. Additionally, the communications manager updates the information about other devices in the registry 18 based on server messages and registry broadcasts.

The applications manager 44 provides an interface between the service applications 16 and the communications manager 42, the registry 18 and the personalization module 48 of the client. The applications manager 44 can retrieve or modify local service application settings stored in the registry 18. It also can access or modify the registry's list of other devices within range of the device 12, and information about services available on those users' devices. The applications manager 44 also can send and receive messages through the communications manager 42. Information stored in the personalization system 132 can be accessed or modified (assuming permission is granted) through the personalization module 48.

The personalization module 48 serves as an interface to the personalization system 132 and provides access to user information, user preferences, and user permissions stored in the personalization system. The personalization module 48 is capable of caching information and synchronizing information with the personalization system 132. It can access information stored in the personalization system 132 in a manner that is transparent to the entity requesting the information. The personalization module 48 provides the user name for message headers and provides public or private encryption keys to the security module 46 through the communications manager 42.

The security module 46 is responsible for providing secure communications between the device 12 and other devices and executes a cryptographic algorithm. The security module 46 obtains security information from the communications manager 42. It encrypts and decrypts messages, digitally signs outgoing messages and verifies the digital signatures of incoming messages.

A "sendMessage" instruction (see FIG. 4A) in an application can call a client module routine that allows messages to be sent to other wireless devices through the facilities of the chip.

Message Communication and Encryption

FIGS. 8A and 8B show how a message initiated by a service application 16 can be sent from the device 12. The particular service application 16 passes 1100 a message with an identification of the intended recipient to the applications manager 44. In this example, it is assumed that the application service requests that the transmission of the message be secure and guaranteed. The applications manager 44 passes 1102 the message and the recipient's identification to the communications manager 42 and requests that the message be transmitted in a secure and guaranteed manner. The communications manager 40 passes 1104 the message and security information to the security module 46. The security module 46 executes the cryptographic algorithm on the message and returns 1106 the encrypted message to the communications manager 42. The communications manager 42 then passes 1108 the encrypted message to the confirmation manager 40 and specifies the channel of communication.

The confirmation manager 40 generates 1110 a message identification number and attaches it to the message header. The confirmation manager 40 also adds 1112 the encrypted message to its queue of non-confirmed messages. The confirmation manager 40 passes 1114 the encrypted message and an identification of the specified channel to the transfer module 30. The transfer module 30 then sends 1116 the encrypted message over the specified communication channel. If the confirmation manager 40 does not receive a confirmation within a specified time frame, it re-sends the message.

The transfer module in the recipient device receives 1118 the encrypted message and passes it to the recipient device's confirmation manager. The confirmation manager in the receiving device passes 1120 the message to the communications manager. In addition, the confirmation manager in the recipient device adds the message identification number to its list of received messages and generates 1122 a confirmation message that is passed to the transfer module in the recipient device. The transfer module sends 1124 the confirmation message over the same communication channel over which the original message arrived. The transfer module 30 in the sending device 12 receives the confirmation message and passes 1126 it to the confirmation manager 40. The confirmation manager 40 then removes 1128 the original message from its queue of messages that are awaiting confirmation.

After receiving the encrypted message, the communications manager in the recipient device removes 1130 the header and passes 1132 the encrypted, digitally signed message to the security module. The security module responds 1134 to the communications manager with the sender's identity. The communications manager in the recipient device then adds 1136 the decrypted message to its message queue and notifies 1138 the user and service application, according to the settings in the registry of the recipient device.

To receive the decrypted message, the service application requests 1140 the message from the communications manager through the applications manager in the recipient device. The communications manager passes 1142 the next message marked for the intended application from the message queue to the service application. The communications manager then deletes 1144 the message from its message queue.

In addition to sending and receiving messages, a service application 16 can retrieve or modify data and permissions stored in the personalization system 132 by calling functions of the personalization module's API through the applications manager 44. Additionally, a service application 16 can view information about users and devices within range of the device 12 by calling functions of the registry's API through the applications manager 44. Similarly, a service application 16 can retrieve or modify service application settings on the local device 12 by calling functions of the registry's API through the applications manager 44.

Uses

Figure 9:
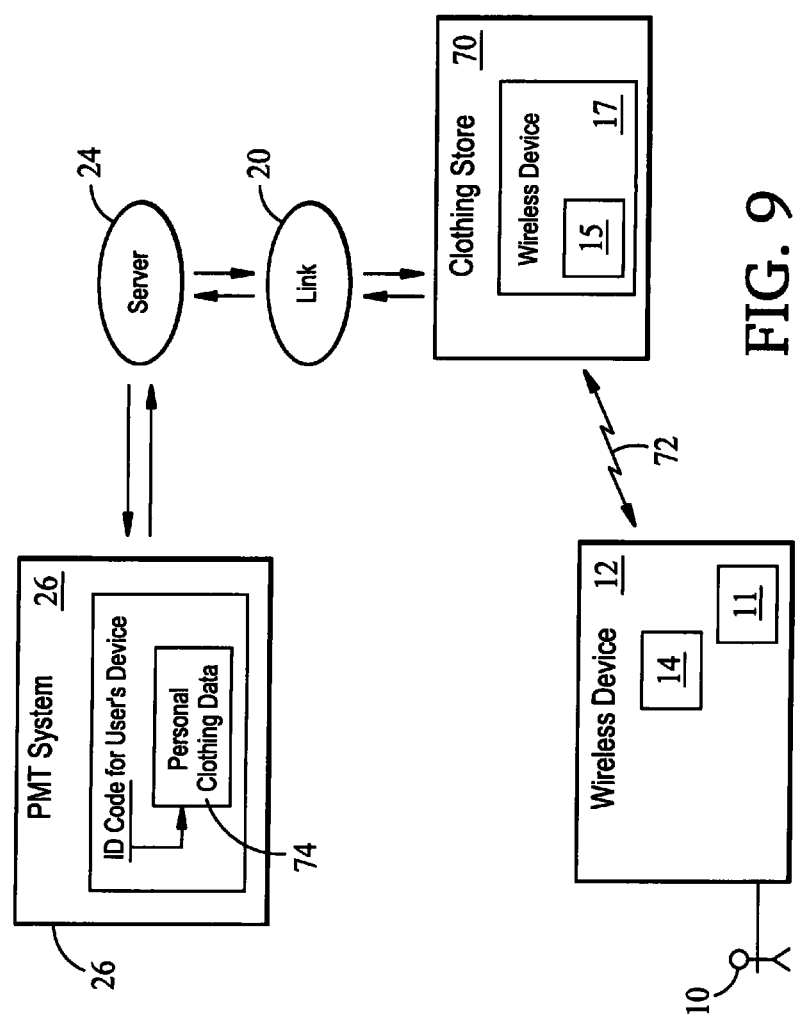

As shown in FIG. 9, in one use of the system described above, a clothing store 70 at a fixed location provides electronic coupons to potential customers. A device 17 with a Bluetooth chip 15 is mounted in the store 70. If a user carrying a mobile device comes within range of the chip 15, the device 17 detects and stores that information in its client's service registry. The device 17 can obtain information 74 about the user from the personalization system 132. Such information 74 may include, for example, the clothing size and clothing purchase history of the user. Access to such information can be subject to the grant of permission by the user.

The device 17 can send one or more electronic coupons to the user's device 12 by incorporating the coupons into one or more messages sent directly through the Bluetooth link or indirectly through a local area network (LAN). The messages containing the coupons can inform the user of sales and items that may be of special interest to the user based on the information obtained from the personalization system. The electronic coupons can be turned in and used to purchase items from the store 70 by communicating directly with the device 17 over the LAN.

The user need not wait for coupons to be sent to his device 12. For example, once the user is within range of the store 70, the registry associated with the client module residing on the user's device 12 would store the identification code for the store 70. The user can use the device 12 to view the various coupons offered by the store 70.

Another application can provide a service that acts as a shopping assistant to match user preferences to available store inventory. In one scenario, the user may want information about a particular product from stores in a specified area such as a commercial street or shopping mall. Stores would update information stored in the personalization system about their product inventory. The user would use the device 12 to request information from the personalization system regarding the availability of various models, sizes, costs, of the particular product from stores in the specified area. A list of the available products and related information then would be provided to the user's device. An identification code can be associated with each store that can be used as discussed below.

After reviewing the information obtained from the personalization system, the user can get additional information from the personalization system, for example, about promotions or coupons that the listed stores may be offering. After selecting a particular store, the user enters the store identification code into the device 12 to access a link to the selected store, for example, over the Internet 22. Once the user's device 12 is within range of the store's Bluetooth-enabled device, the two devices would recognize one another. Communications then would take place directly or over the local network. The user would be able to purchase items from the store using the device 12. Personnel at the store may gather the purchased items and send a message to the user when the items are ready to be picked up.

Figure 10:
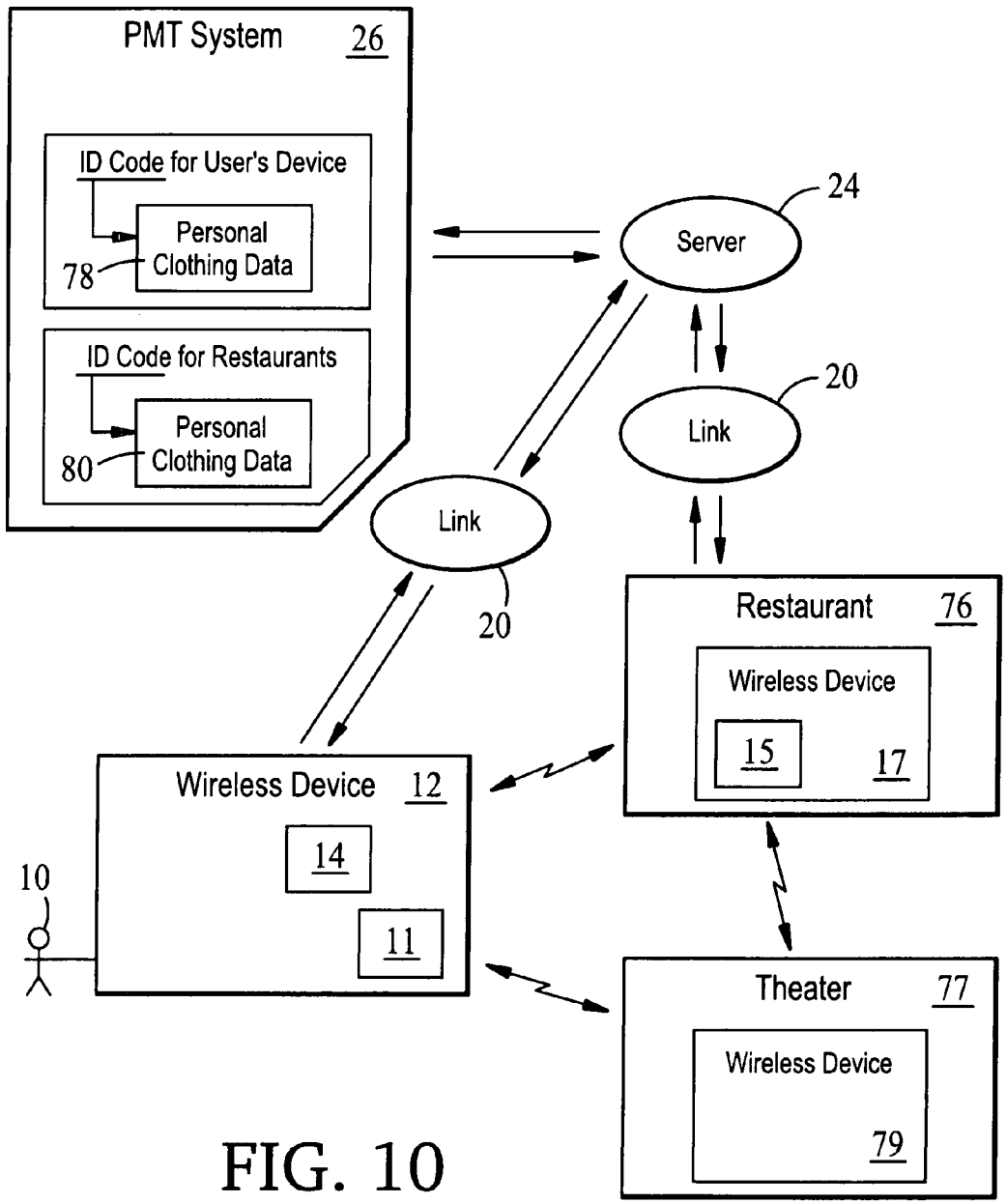

As shown in FIG. 10, another application allows the user to place an order, for example, at a restaurant 76 and pay for the order without having to wait in line. The user orders and pays while sitting at a table or walking in the vicinity of the restaurant. When the user arrives at the restaurant 76, the restaurant's Bluetooth-enabled device 17 recognizes the presence of the user's device and retrieves the user's personal information from the personalization system. The personal information may include the customer's food preferences or the usual order that the customer places at the restaurant 76. The restaurant's device 17 sends a message to the customer's device asking, for example, if the customer wishes to place his usual order. The customer can place an order and pay using the device. The customer also can access the personalization system to obtain information about the restaurant 76. The restaurant information 80 can include, for example, a menu, a list of specials, and available coupons. Such information can be obtained directly from the restaurant as well using the restaurant's local network.

The information regarding the user's preferences retrieved by the restaurant's device 17 from the personalization system may include information that can facilitate transactions between different commercial entities with respect to the identified customer. For example, when the user passes within the vicinity of the restaurant, the restaurant's Bluetooth-enabled device 17 recognizes the presence of the user's device and retrieves the user's personal information 78 from the personalization system. The personal information 78 may indicate that the user enjoys movies. The restaurant's device would exchange information with a local theater 77 that also is in possession of a Bluetooth-enabled device 79, and the local theater 77 would post an electronic movie discount on the user's device.

Figure 11:
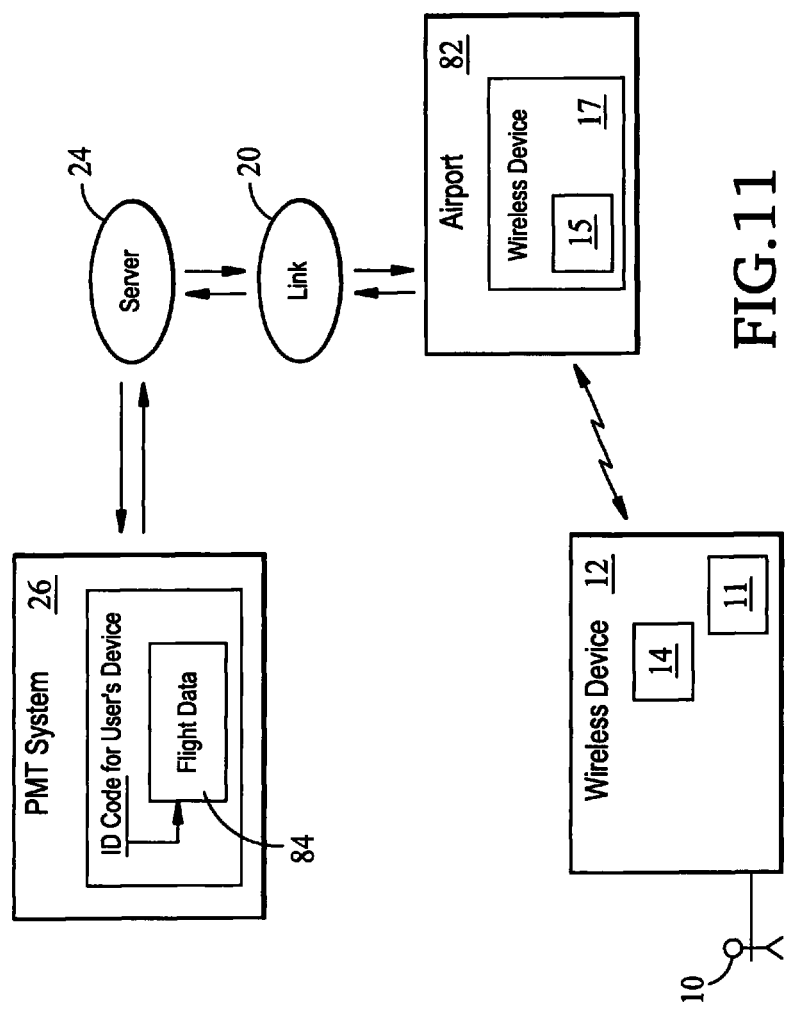

Another application can facilitate travel. For example, assume the user is scheduled to depart on an airline flight. As shown in FIG. 11, upon arrival at the airport 82, a Bluetooth-enabled device 17 would detect the presence of the user's device. The airport's device 17 obtains the user's scheduled flight number and time of departure from the personalization system. The device 17 then sends flight, airport and ground transportation information tailored to the traveler's itinerary to the user's device. Similar applications can be used in connection with other means of travel such as trains or buses.

Figure 12:
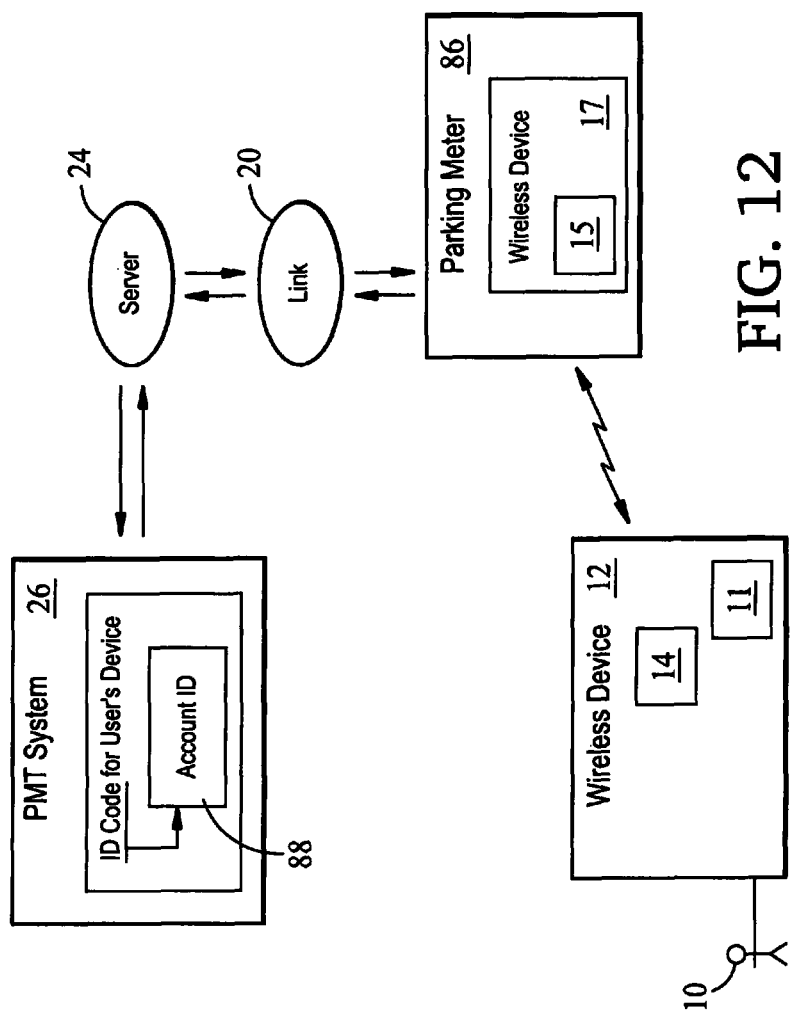

Other applications can be used in connection with parking meters to facilitate payment through use of a Bluetooth-enabled device. In one scenario, users would purchase pre-paid units of time. As shown in FIG. 12, when a user in possession of the device parks a car near a parking meter 86, a Bluetooth-enabled device 17 in the parking meter senses the presence of the user's device 12. The device 17 checks the user's account identification number 88 by accessing the personalization system 26 and sends a message to the user's device requesting an indication of how much time the user plans to park at the location. Once the user 10 responds, payment automatically can be deducted from the user's account. The application program can consistently show how much time is left on the meter 86, and can allow the user to add time to the meter from distant locations.

Figure 13:
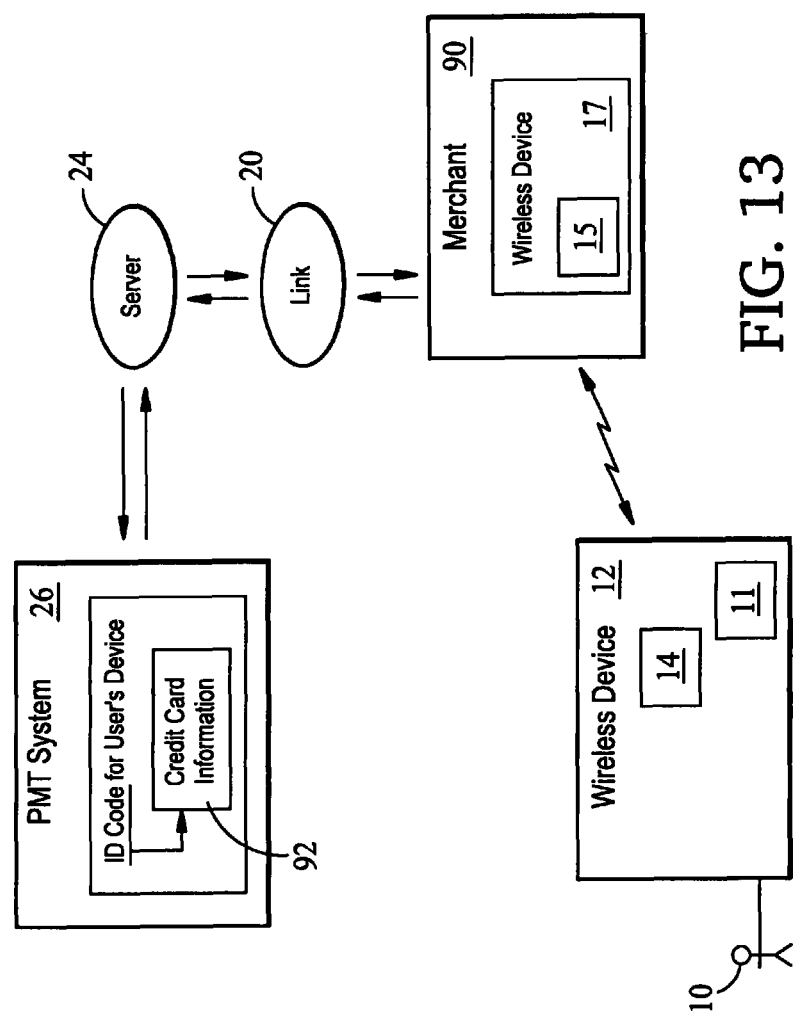

A wireless credit card application program can allow the user to make purchases with the device from a merchant 90. For example, as shown in FIG. 13, a merchant's Bluetooth-enabled device 17 would sense the presence of the user's device and, if permission is granted, would obtain the user's credit card information 92, including the user's name, account number and account expiration date, from the personalization system 26. Furthermore, the application program can store a personal budget set by the user. If the user exceeds his personal budget, a message is sent to the device indicating that the personal budget has been exceeded.

Figure 14:
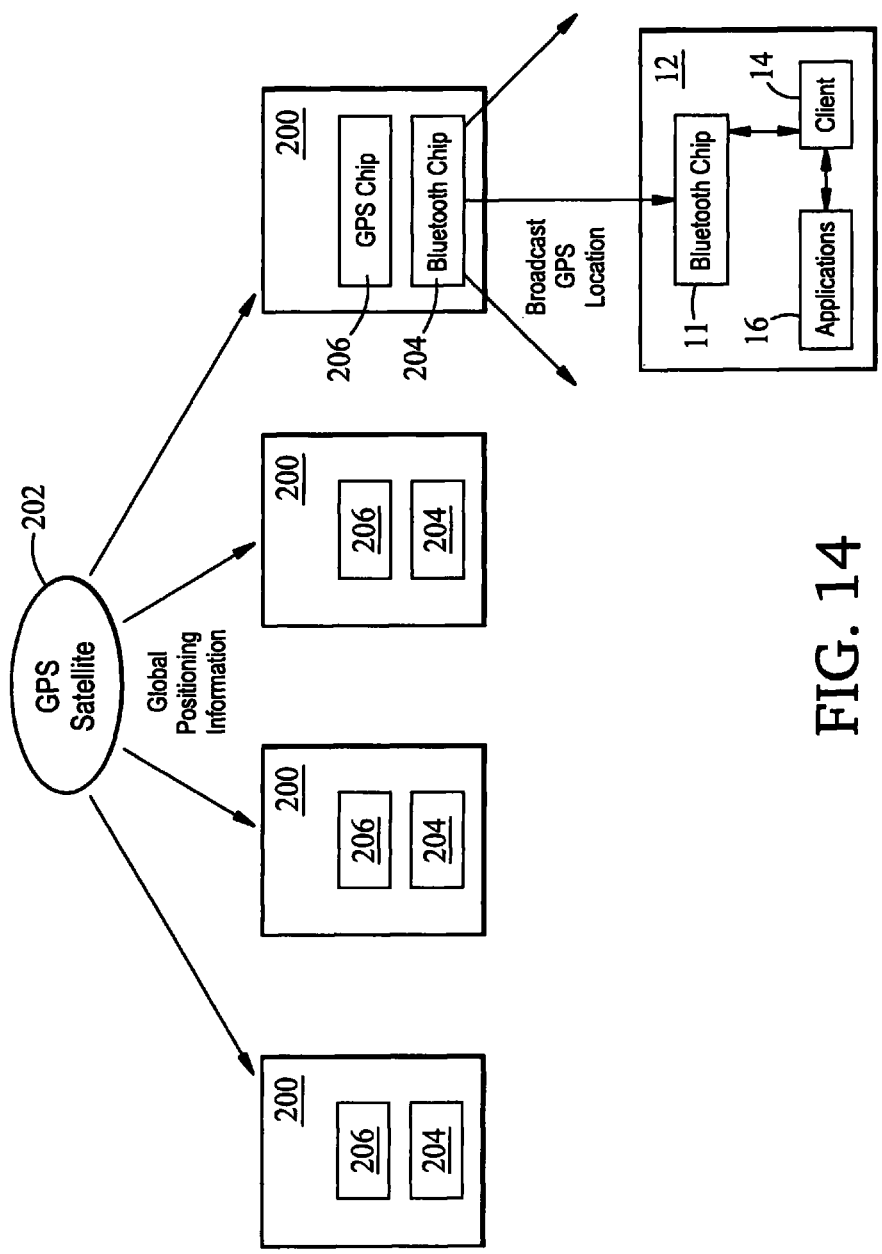

A network of strategically placed Bluetooth-enabled devices in parking meters, city streets lamps, and other locations can provide a virtual global positioning system (GPS) that allows a user's device to know its precise location without requiring that the user's device carry a global positioning chip. As illustrated in FIG. 14, a number of Bluetooth-enabled devices 200 carry a Bluetooth chip 204 as well as a global positioning chip 206 that allows the device 200 to determine its GPS location by receiving global positioning information from a satellite 202. Each device 200 can periodically broadcast its global positioning location. Other Bluetooth-enabled devices that are within range of one of the devices 100 can receive the broadcast and thereby determine their own location. A variety of location-based applications 16, such as an electronic map identifying the user's location, can be implemented without requiring a costly GPS chip on the device 14.

Yet another application program that can run on the client 14 allows users to post information that can be retrieved and read by other parties. A virtual information board can be implemented by storing the information on a local device or on the server. For example, a restaurant can post its daily specials using such an application to help reduce the cost of menus.

A public information booth can have a Bluetooth-enabled device that provides information about museums, historical sites, statues and other sites of interest within a particular geographical location. An application can be run on the client residing on the user's device. The devices interact according to the Bluetooth protocol, and the device sends out a brief history or summary of the area to the user's device. The application also allows a user to view a list and summary of the various sites in the area. Self-guided tours can be tailored so that the user only receives information about specific aspects of the area based on the user's interest.

Another application can serve as a wireless identity tool. This tool can facilitate the user's navigating through a hospital or other bureaucracy. For example, in a hospital, the user can sign in or pick up medical prescriptions without completing written forms. The application can provide the appropriate information.

Other application programs can provide communications with another device associated with an entity such as an individual who is free to roam from one location to another. Exemplary application programs include instant messaging, buddy lists, and personal contact cards.

Instant messaging, for example, allows messages to be passed between Bluetooth-enabled devices regardless of whether or not the devices are within local range of one another. The location of the parties may impact which means of communication is used to send a particular message. However, the sender of the message need not be concerned with the means of communication or device compatibility issues because the incoming message will be tailored to the recipient's device. If an instant message cannot reach its destination, for example, because the intended recipient has set his permissions so as not to allow instant messaging or because the recipient device does not have the proper software, the sender can be notified that the message cannot be delivered.

Other applications that can run on the device facilitate the use of buddy lists. Thus, a user of the device can be notified automatically when a buddy enters or leaves the local area network. The user can add or remove persons on the buddy list. For more privacy, the user can select an option in the application to prevent other persons on the buddy list from being informed of the user's entering or leaving particular networks. A list can be stored in the personalization system to specify information and communication access permissions. The list can be used across multiple applications and can be updated dynamically through the personalization system. Different members of the buddy list can have different permissions.

Another application program allows the user to send a virtual business card from the device. In some situations, the electronic business card can include graphical images of an actual business card.

Other implementations are within the scope of the claims.

The invention claimed is:

1. A method for identifying and customizing communication with a mobile device, the method comprising:
    identifying automatically through the use of a short-range wireless communication protocol, with an electronic device, the presence of a short-range wireless device within a particular geographic area, the electronic device including a first interface supporting short-range wireless communication and a second interface supporting communication over a network;
    requesting with the electronic device, based on the identifying, data about an individual in possession of the short-range wireless device from a remotely located commonly accessible database over the network using the second interface, the remotely located commonly accessible database holding information about a plurality of individuals;
    receiving the data about an individual in possession of the short-range wireless device at the electronic device from the remotely located database via the second interface;
    identifying a facility within a predefined distance from the electronic device based on the received data, a second electronic device disposed at the facility; and
    transmitting an indication of the identifying of the short-range wireless device and the received data from the electronic device to the second electronic device disposed at the facility, the second electronic device equipped with a communication interface supporting short-range wireless communication,
    wherein the second electronic device communicates with the short-range wireless device via its communication interface supporting short-range wireless communication based on the received data.

2. The method of claim 1 in which access to the data about the individual in possession of the short-range wireless device in the commonly accessible database is contingent on permission of the individual.

3. The method of claim 1 further comprising:
    enabling the individual in possession of the short-range wireless device to access and modify the data in the commonly accessible database using the short-range wireless device.

4. The method of claim 1 in which the information sent to the short-range wireless device includes promotional material for the facility.

5. The method of claim 1 further comprising;
    allowing the individual in possession of the short-range wireless device to obtain information about an entity associated with the electronic device from the commonly accessible database using the short-range wireless device.

6. The method of claim 1 in which recognizing that the short-range wireless device is within the particular geographic area is based on receipt of a message from the short-range wireless device, the message including an identification code mapped to the individual.

7. The method of claim 1 in which the data about the individual in possession of the short-range wireless device includes personal preferences of the entity.

8. An electronic device for identifying and customizing communication with mobile wireless devices, comprising:
    a first short-range wireless communication interface; and
    a second interface supporting communication over a network, the electronic device configured to:
        identify automatically through the use of a short-range wireless communication protocol the presence of a short-range wireless device within a particular geographic area near the electronic device;
        request data about an individual in possession of the short-range wireless device based on the identifying from a remotely located commonly accessible database over the network using the second interface, the remotely located commonly accessible database holding information about a plurality of individuals;
        receive at the electronic device the data about the individual in possession of the short-range wireless device from the remotely located database via the second interface;

identify a facility within a predefined distance from the electronic device based on the received data, a second electronic device disposed at the facility; and transmit an indication of the identifying of the short-range wireless device and the received data from the electronic device to the second electronic device disposed at the facility, the second electronic device equipped with a communication interface supporting short-range wireless communication, wherein the second electronic device communicates with the short-range wireless device via its communication interface supporting short-range wireless communication based on the received data.

9. A system for identifying and customizing communication with a mobile device, comprising:
- a commonly accessible database holding data about a plurality of individuals in possession of respective short-range wireless devices, the commonly accessible database accessible over a network; and
- an electronic device that includes a first short-range wireless communication interface that enables communication with one or more of the plurality of short-range wireless devices and a second communication interface that enables communication over the network with the commonly accessible database, the electronic device configured to:
  - identify automatically through the use of a short-range wireless communication protocol the presence of one of the plurality of short-range wireless devices within a particular geographic area near the electronic device;
  - request data about an individual in possession of the one of the plurality of short-range wireless devices, based on the identifying, from the commonly accessible database over the network using the second interface, the remotely located commonly accessible database holding information about a plurality of individuals;
  - receive at the electronic device the data about the individual in possession of the one of the plurality of short-range wireless devices from the remotely located database via the second interface;
  - identify a facility within a predefined distance from the electronic device based on the received data, a second electronic device disposed at the facility; and
  - transmit an indication of the identifying of the short-range wireless device and the received data from the electronic device to the second electronic device disposed at the facility, the second electronic device equipped with a communication interface supporting short-range wireless communication, wherein the second electronic device communicates with the short-range wireless device via its communication interface supporting short-range wireless communication based on the received data.

* * * * *